(12) United States Patent
Yoshikawa et al.

(10) Patent No.: US 7,160,431 B2
(45) Date of Patent: Jan. 9, 2007

(54) METHOD AND DEVICE FOR FORMING A DYNAMIC PRESSURE-GENERATING GROOVE IN A FLUID DYNAMIC PRESSURE BEARING

(75) Inventors: Hiroshi Yoshikawa, Miyota-Machi (JP); Tomoyuki Yasuda, Miyota-Machi (JP)

(73) Assignee: Minebea Co., Ltd., Nagano (JP)

( * ) Notice: Subject to any disclaimer, the term of this patent is extended or adjusted under 35 U.S.C. 154(b) by 170 days.

(21) Appl. No.: 10/636,150

(22) Filed: Aug. 7, 2003

(65) Prior Publication Data

US 2004/0094430 A1 May 20, 2004

(30) Foreign Application Priority Data

Aug. 7, 2002 (JP) .............................. 2002-229437

(51) Int. Cl.
*B23H 3/00* (2006.01)
*B23H 3/10* (2006.01)
*F16C 17/02* (2006.01)
*F16C 33/14* (2006.01)

(52) U.S. Cl. ...................... 205/640; 205/672; 205/673
(58) Field of Classification Search ................ 205/640, 205/672, 273
See application file for complete search history.

*Primary Examiner*—George Wyszomierski
*Assistant Examiner*—Michael P. Alexander
(74) *Attorney, Agent, or Firm*—Joel E. Lutzker, Esq.; John C. Garces, Esq.; Schulte Roth & Zabel (57) ABSTRACT

A method and apparatus for forming a fluid dynamic pressure groove in a fluid dynamic pressure bearing is provided. The method is accomplished by initially positioning and securing multiple workpieces to be machined to their respective machining devices. An electrochemical dissolving effect is imparted to each target surface of the multiple workpieces and then at least one fluid dynamic pressure groove is formed on each target surface of the multiple workpieces. Each groove may have a specified shape, dimension and surface condition. An electrolyte is directed from a common electrolyte tank to each of the machining devices used on the multiple workpieces.

3 Claims, 5 Drawing Sheets

Electrolytic fluid

PRIOR ART

Figure 5

METHOD AND DEVICE FOR FORMING A DYNAMIC PRESSURE-GENERATING GROOVE IN A FLUID DYNAMIC PRESSURE BEARING

CROSS-REFERENCE TO RELATED APPLICATIONS

This application claims all rights of priority to Japanese Patent Application Ser. No. 2002-229437, filed Aug. 7, 2002 (pending).

FIELD OF THE INVENTION

The present invention relates to a method and device for forming a fluid dynamic pressure groove in a fluid dynamic pressure bearing used, for example, as a high precision bearing in a hard disk drive device spindle motor.

BACKGROUND OF THE INVENTION

Rapid development of memory storage devices achieved in recent years demands an increase in recording density and capacity of such devices. This, in turn, requires an improvement in the device's track per inch (TPI) characteristic. In order to improve the TPI of a memory storage device, for example a hard disk drive, better performance characteristics, such as a spindle motor speed, rotational accuracy, noise level, shock resistance, etc., should be achieved. With respect to the bearing systems utilized in hard disk drives, an improvement in a rotational vibration and ability to withstand high-speed rotation has been sought.

To respond to industry's demand for the improvement in rotational vibration, ball bearing systems have been manufactured having rotating elements made of materials having low adhesion and superior wear resistance. Specifically, ball bearing systems have been manufactured with rotating elements made of silicone nitride ceramics. Additionally, the machining accuracy of all bearing elements, i.e., the inner and outer rings and rotary members, is continued being improved upon.

The other known solution to the above demand for even greater speeds, is the use of fluid dynamic pressure bearings as a replacement for conventional ball bearings. Fluid dynamic bearings are lower in noise and allow to dramatically improve rpm speed of spindle motors used in hard disk drives.

In these fluid dynamic pressure bearings, a lubricating fluid (for example, oil or air) is filled into a gap formed between a shaft and a support member, typically a sleeve. Dynamic pressure generated in the lubricating fluid by a relative rotation of the shaft and the support member causes the shaft to be suspended away from the inner walls of the support member, thus forming a hydrodynamic bearing.

To facilitate generation of the hydrodynamic pressure and formation of the bearing, pressure-generating grooves may be provided the shaft and/or the support member. To form pressure-generating grooves, a pattern of sideways V-shaped or herringbone-shaped grooves is etched into the bearing surface. In the formation of these sideways V-shaped pressure-generating grooves, an electrolytic machining method is used to form the requisite shape, dimensions and surface condition on the relevant workpiece surface by imparting an electrochemical dissolving action to the workpiece surface to be machined. Therefore, machining accuracy, improvement of productivity, efficiency, etc. of the electrolytic machining method have become the new issues in the bearing manufacturing process.

Here, before explaining the details of the electrolytic machining method, we shall first briefly explain the structure of a spindle motor having a rotatable shaft supported for rotation by a fluid dynamic pressure bearing.

Figure 5:
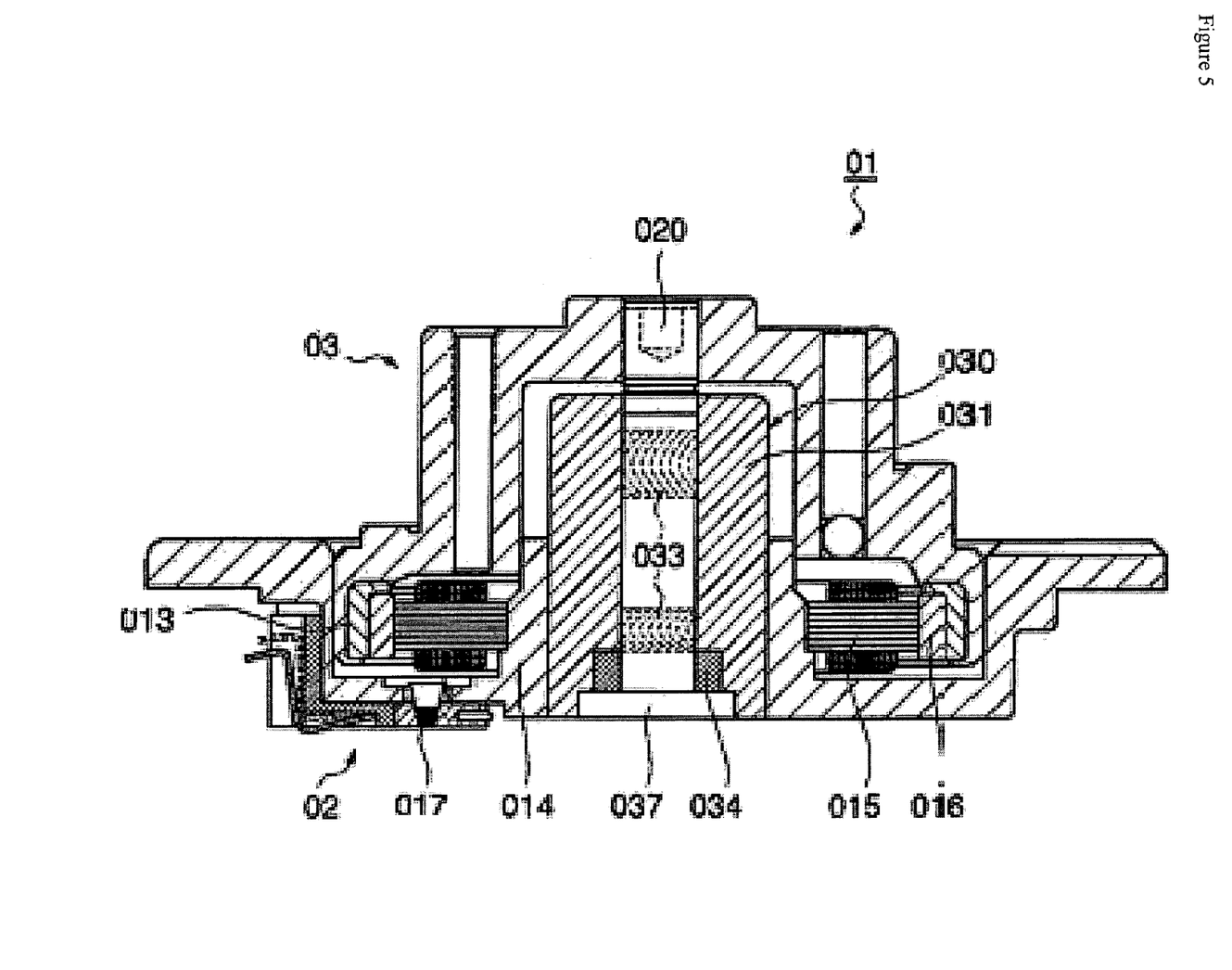
FIG. 5 is a cross-sectional view of a conventional spindle motor having a rotary shaft supported by a fluid dynamic pressure bearing.

As shown in FIG. 5, spindle motor 01 is provided with rotor hub 03 that rotates relative to base 02. Fluid dynamic pressure bearing 030 is interposed between base 02 and rotor hub 03. Rotary shaft 020 is vertically mounted to rotor hub 03 and is inserted into bearing sleeve 031 secured to the inner perimeter surface of interior cylindrical wall 014 of base 02. Lubricant is supplied to a sliding portion of bearing sleeve 031 and rotary shaft 020. When the shaft rotates, the fluid dynamic pressure is generated in the lubricant due to the action of herringbone-shaped dynamic pressure-generating groove 033 formed on the inner surface of the sleeve 031. Formed dynamic pressure causes rotary shaft 020 to float upward from bearing sleeve 031. Thrust plate 034 is mounted at the bottom of rotary shaft 020. Although not shown in detail, dynamic pressure-generating herringbone shaped grooves may be formed on the upper end surface of a thrust ring 034 and/or the step surface of bearing sleeve 031 which opposes this upper end surface. Further, herringbone-shaped dynamic pressure-generating grooves may be formed on the lower end surface of the thrust plate and/or on the upper surface of counter plate 037 fit into the bottom end of bearing sleeve 031. Lubricant is supplied between the step of bearing sleeve 031 and the upper surface of thrust plate 034, and between the lower surface of the thrust plate and counter plate 037. When rotary shaft 020 rotates, the lubricant pressure rises due to the action of the (herringbone-shaped) dynamic pressure-generating groove, the thrust ring 034 mounted on the rotary shaft 020 floats up from the counter plate 037, rotating in a non-contacting state in a position midway between the sleeve 031 step surface and the counter plate 037 inner surface, not contacting the step surface of the sleeve 031.

The electrolytic machining method used in the invention of this application is a machining method for obtaining a specified shape, dimension and surface condition of a groove by concentrating or limiting the electrolytic dissolving action on a specified part of a workpiece in the course of machine forming the above-described dynamic pressure-generating groove.

Figure 4:
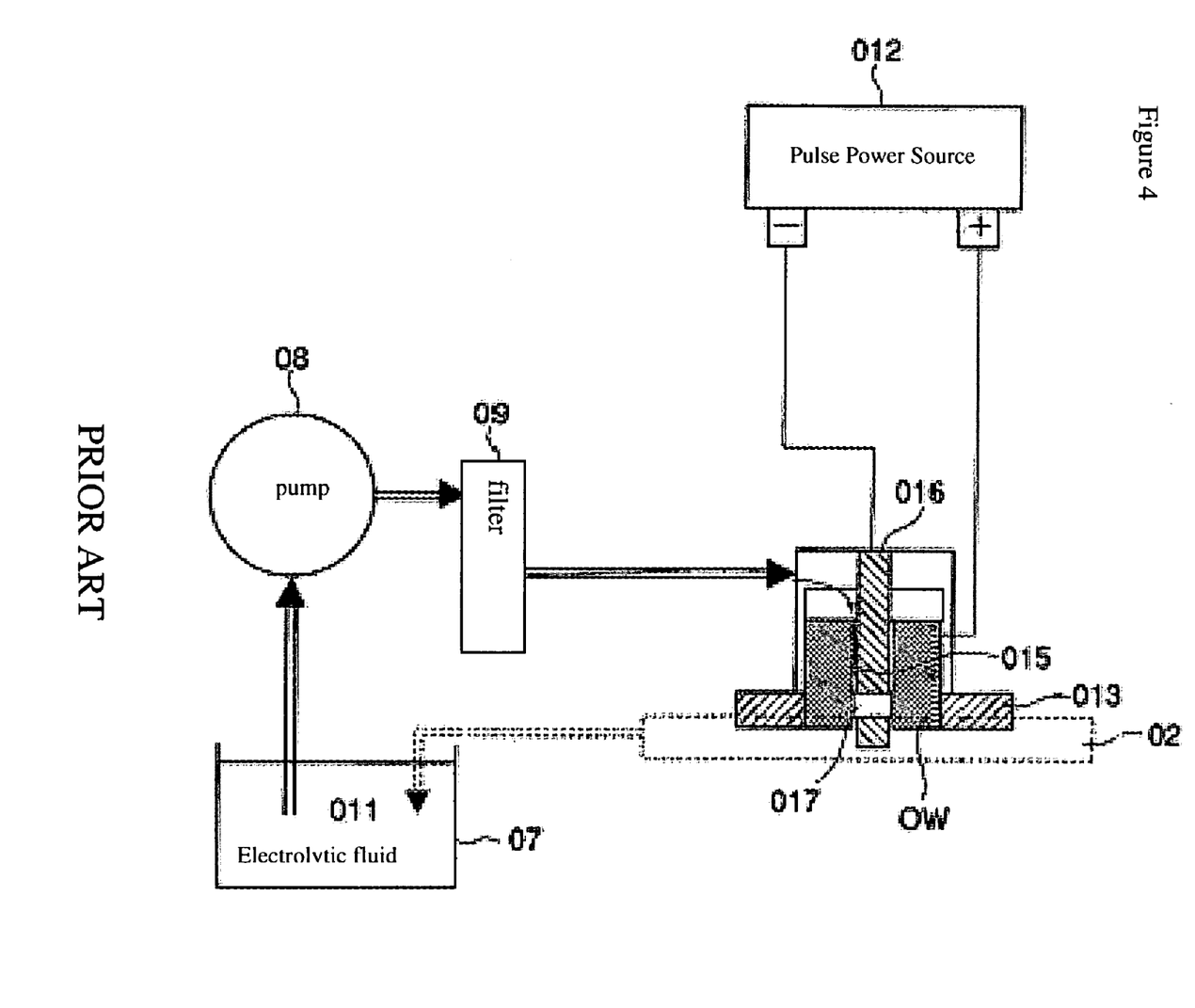
FIG. 4 is a schematic diagram depicting the construction of a conventional electrolytic machining device for forming a fluid dynamic pressure bearing dynamic pressure-generating groove.

Prior technology for this electrolytic machining method is depicted in FIG. 4. FIG. 4 is a diagram showing the overall construction of an electrolytic machining device for the purpose of forming a dynamic pressure-generating groove on the inner perimeter surface of a hollow cylindrical workpiece (sleeve) OW used as a support member for a spindle motor shaft.

A positive terminal of the machining pulsed power supply 012 is connected to the workpiece OW, while a negative terminal is connected to tool 016, such that a DC pulsed voltage is applied between machining surface 015 of the workpiece OW and tool 016.

Tool 016 is provided with electrode 017 having sideways V-shaped (herringbone shaped) projecting portions approximately corresponding in shape and dimensions to the grooves which will be formed on the target surface. The size of sideways V-shaped (herringbone shaped) projecting portions of electrode 017 is usually somewhat smaller than the size of a desired dynamic pressure-generating groove. Tool 016 with projecting electrode 017 is inserted into the inner bore of the workpiece OW such that during electrolytic machining the electrode faces the target machining surface 015 across a tiny gap. Target machining surface 015 will later form the inner circumferential surface of the bearing sleeve. The workpiece OW is accurately positioned for the electro-machining process using stationary fixture 013 and is secured to machining bed 02.

Electrolyte 011 stored in an electrolytic tank 07 is directed to the tiny gap provided between target machining surface 015 of the workpiece OW and the outer surface of tool 016. Electrolyte 011 is configured so as to be supplied in a fixed amount to the provided tiny gap by pump 08 through filter 09. Electrolyte 011 that has passed through this tiny gap is then returned to electrolytic tank 07. Returned electrolyte 011 is again supplied through circulation by means of pump 08.

During electrolytic machining, pump 08 operates and electrolyte 011 is continuously supplied to the aforementioned gap from electrolyte tank 07. Here, when electrolyte 011 passes through the gap between target machining surface 015 of the workpiece OW and tool 016, products of electrolysis mix into electrolyte 011. In electrolytic machining, current densities are extremely high and machining gaps are extremely small, so the occurrence of electrolytic products and heating of electrolyte 011 have a significant effect on the quality of machining. Thus, there is a danger that if these effects are not quickly removed, machining may not progress. It is therefore necessary for the flow speed of electrolyte 011 to be fast, and, while there may be variation depending on machining conditions, it is generally desirable for the flow speed to be in the range of 2–10 m/sec. When the electrolysis products are sedimentary, recirculating electrolyte 011 should be used only after cleaning. To separate and remove electrolytic products from the electrolyte 011 in the electrolyte tank 07 centrifuging, precipitation, filtering, or a combination of all of these may be used.

In a device thus constituted, current flows from the pulsed power supply 012 and between the workpiece OW and tool 016 when a DC voltage (pulsed voltage) is applied between the workpiece OW and tool 016 for a specified time (electrolytic machining time). Assuming, for example, that the electrolyte is a sodium nitrate (NaNO$_3$) fluid and the workpiece OW surface is nickel (Ni), then primarily the following electrolytic reaction occurs:

Workpiece surface: Ni→Ni$^{++}$+2e$^-$
Tool surface: 2Na+=2H2O=2NaOH=H$_2$

When the workpiece OW is Fe, the following type of reaction occurs:

Workpiece surface: Fe→Fe$^{++}$+2e$^-$
Fe$^{++}$=2OH$^-$→Fe(OH)$_2$
Tool surface: 2H$^+$+2e$^-$→H$_2$ In this type of reaction, the surface material of the workpiece OW facing tool 016 dissolves in the electrolyte 011, and a dynamic pressure-generating groove having a shape corresponding to the projecting pattern of the projecting electrode 017 is formed on target machining surface 015 of the workpiece OW.

During electrolytic machining, the current flowing between the workpiece OW and the tool 016 is controlled to be turned off and on as necessary for electrolytic machining. The shape and dimensions of the desired dynamic pressure-generating groove are determined by setting machining conditions such as the size of the gap between target machining surface 015 of the workpiece OW and tool 016. Other electrolytic machining conditions that may influence the shape and dimensions of the grooves include the material of the workpiece OW, the applied current (A) and the pulsed voltage application time (T). A dynamic pressure-generating groove of the required shape is thus formed in target machining surface 015 of the workpiece OW.

In currently utilized electro-machining processes, a different machining bed, electrolyte tank, and pulsed power supply have to be provided for each workpiece type. Therefore, it is currently not possible to line up workpieces of the same type or differing types and machine them simultaneously. Therefore, machining has to be performed one item at a time, resulting in poor productivity. It is also currently necessary to adjust settings for each workpiece type that is very time consuming. Furthermore, each time the shape of the workpiece or the shape of the desired dynamic pressure-generating groove is changed, additional time is required for changeover to set the new precise gap width. Therefore, from a productivity and cost standpoint, market demands are not adequately met by currently available electro-machining methods.

An individually set up electrolyte tank is erected on each machining device, and, because electrolyte tanks differ from one machining device to another even for the same workpiece, machining similar workpieces on different devices may take place under different electrolyte concentrations and states of electrolyte deterioration. This means that electrolytic concentration has to be controlled separately for each electrolyte tank.

SUMMARY OF THE INVENTION

The invention of the present application proposes to solve the problems with the conventional methods and devices utilized to form fluid dynamic pressure bearing dynamic pressure-generating grooves. Further, the present invention provides a method and device for forming fluid dynamic pressure bearing dynamic pressure-generating groove reducing the set-up time for each of multiple workpieces and allowing to simultaneously machine multiple different workpieces with different machining conditions, so that dynamic pressure-generating groove productivity is improved, manufacturing cost is reduced, the machining accuracy of electrolytic machining performed on multiple workpieces is stabilized and the quality of each formed dynamic pressure-generating groove is improved.

In general, in a first aspect, the invention features a method for forming a fluid dynamic pressure groove in a fluid dynamic pressure bearing. The method is accomplished by initially positioning and securing multiple workpieces to be machined to their respective machining devices and imparting an electrochemical dissolving effect to each target surface of the multiple workpieces, each of these workpieces serving as a part of the fluid dynamic pressure bearing, and forming at least one fluid dynamic pressure grove on each target surface. Each groove may have a specified shape, dimension and surface condition. The same electrolyte is directed from a common electrolyte tank to each machining device used on the multiple workpieces.

The invention, as described above, causes the same electrolytes to be directed from a common electrolytic tank to each of multiple workpiece machining devices. Therefore, when forming dynamic pressure-generating grooves of differing shapes on multiple workpieces of the same or differing types it is possible to use a common electrolytic tank and to reduce manufacturing equipment. It is also possible to supply electrolytes under the same conditions to multiple differing workpieces and, by stabilizing electrolytic machining accuracy, to increase quality. In particular, when multiple workpieces are multiple components of the same finished product, it is possible to have uniform machining accuracy over the whole finished product, thus enabling improved performance.

According to this groove forming method, an electrolytic tank is used in common, so the requirement to separately control each electrolyte tank as in the conventional method, is eliminated simplifying operation control, improving the productivity and reducing manufacturing costs.

In the provided method for forming a pressure-generating groove, all machining devices for multiple workpieces are located on a common machining bed, and machining is accomplished by a pulsed voltage supplied from a machining pulsed power supply.

As a result, multiple workpieces can be simultaneously machined with a common machining bed on a single machining unit (dynamic pressure-generating groove forming device), and when multiple workpieces are multiple components of the same finished product, it is easy to concentrate the required number of each of the component parts, so that manufacturing control is simplified. Controlling the settings for combinations of electrolyte and pulsed voltage to take into account concentration conditions and states of deterioration of the same electrolyte is also made easier, as is quality control over the shape of the dynamic pressure-generating groove formed in the workpiece target work surface. From these standpoints, productivity can be increased as well.

Further, in the method for forming a fluid dynamic pressure bearing dynamic pressure-generating groove, the pulsed voltage supplied from the pulsed power supply is controlled so as to be independently applied to each of the multiple workpieces.

It is thus possible to set machining conditions for each separate workpiece, thus enabling simultaneous manufacturing of differing workpiece types with a common machining bed on a single piece of machining equipment (dynamic pressure-generating groove forming device).

There are cases in which the target machining surface of the workpiece on which the dynamic pressure-generating groove is to be formed is the outside surface of a spindle motor rotary shaft. There are also cases when it is the inside surface of a sleeve which fits over and serves as bearing to the rotary shaft. Depending on the form of the spindle motor, there may be various shapes of workpiece which are targets for machining, but using the provided groove forming method, it is possible, when forming dynamic pressure-generating grooves of differing shapes on differently shaped workpieces, to independently set pulsed voltage and application time for each differently-shaped workpiece, and therefore the demands described above can be easily satisfied.

In general, in a second aspect, the invention features a groove forming device having a means for positioning and securing multiple workpieces to be machined to their respective machining devices; a means for imparting an electrochemical dissolving effect to each target surface of the multiple workpieces, each of said workpieces serving as a part of said fluid dynamic bearing; and a means for forming at least one fluid dynamic pressure grove on said each target surface of said multiple workpieces to be machined, said groove having a specified shape, dimension and surface condition. The same electrolyte is directed from a common electrolyte tank to each machining device used on said multiple workpieces.

The invention, as described above, is such that the same electrolyte is directed from a common electrolyte tank to each machining device for multiple workpieces, so that even when forming dynamic pressure-generating groove of differing shapes in multiple workpieces of the same and differing types, a common electrolyte can be used, and manufacturing equipment can be reduced.

For multiple differing workpieces, electrolyte can be supplied under the same conditions, thus enabling stabilization of the electrolytic machining accuracy and improvement of quality. In particular, when the multiple workpieces are multiple parts of the same finished product, machining accuracy can be maintained through the entire finished product, leading to improved performance.

As the common electrolyte tank can be used with this groove forming device, the need to separately control each electrolyte tank disappears, and operational control can be simplified, while productivity is increased and manufacturing costs are reduced.

In the groove forming device set forth above, multiple machining devices for multiple workpieces are concentrated on a common bed, and machining is carried out by a pulsed voltage supplied from a machining pulsed power supply.

As a result, it is possible to simultaneously machine multiple workpieces with a common machining bed on a single piece of machining equipment (dynamic pressure-generating groove forming device), so that when multiple workpieces are the multiple parts of the same finished product, it is easy to assemble the numbers of each part, and manufacturing control is made easier. Control over settings of electrolyte and pulsed voltage combinations which take into account concentration conditions and degree of degradation in the same electrolyte is also made easier, and quality control over the shape of the dynamic pressure-generating groove formed in the workpiece target machining surface is simplified, as is quality control over the shape of the dynamic pressure-generating groove formed in the workpiece target machining surface. This aspect also permits an increase in productivity.

Further, in the groove forming device the pulsed voltage supplied from the pulsed power supply can be independently applied to each of the multiple workpieces. It is thus possible to set different machining conditions for each workpiece, and to manufacture multiple types simultaneously with a common machining bed on a single machine (dynamic pressure-generating groove forming device).

There are cases in which the target machining surface of the workpiece, in which the dynamic pressure-generating groove is to be formed, is the outside surface of a spindle motor rotary shaft. There are also cases where it is the inner surface of a sleeve which fits over and serves as a bearing to the rotary shaft. Depending on the form of the spindle motor, there may be various shapes of workpiece surfaces which are targets for machining. Using the present groove forming device, it is possible, when forming dynamic pressure-generating grooves of differing shapes on differently shaped workpieces, to independently set pulsed voltage and application time for each differently-shaped workpiece, and therefore the demands described above can be easily met.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION OF THE PREFERRED EMBODIMENTS AND THE DRAWINGS

Figure 1:
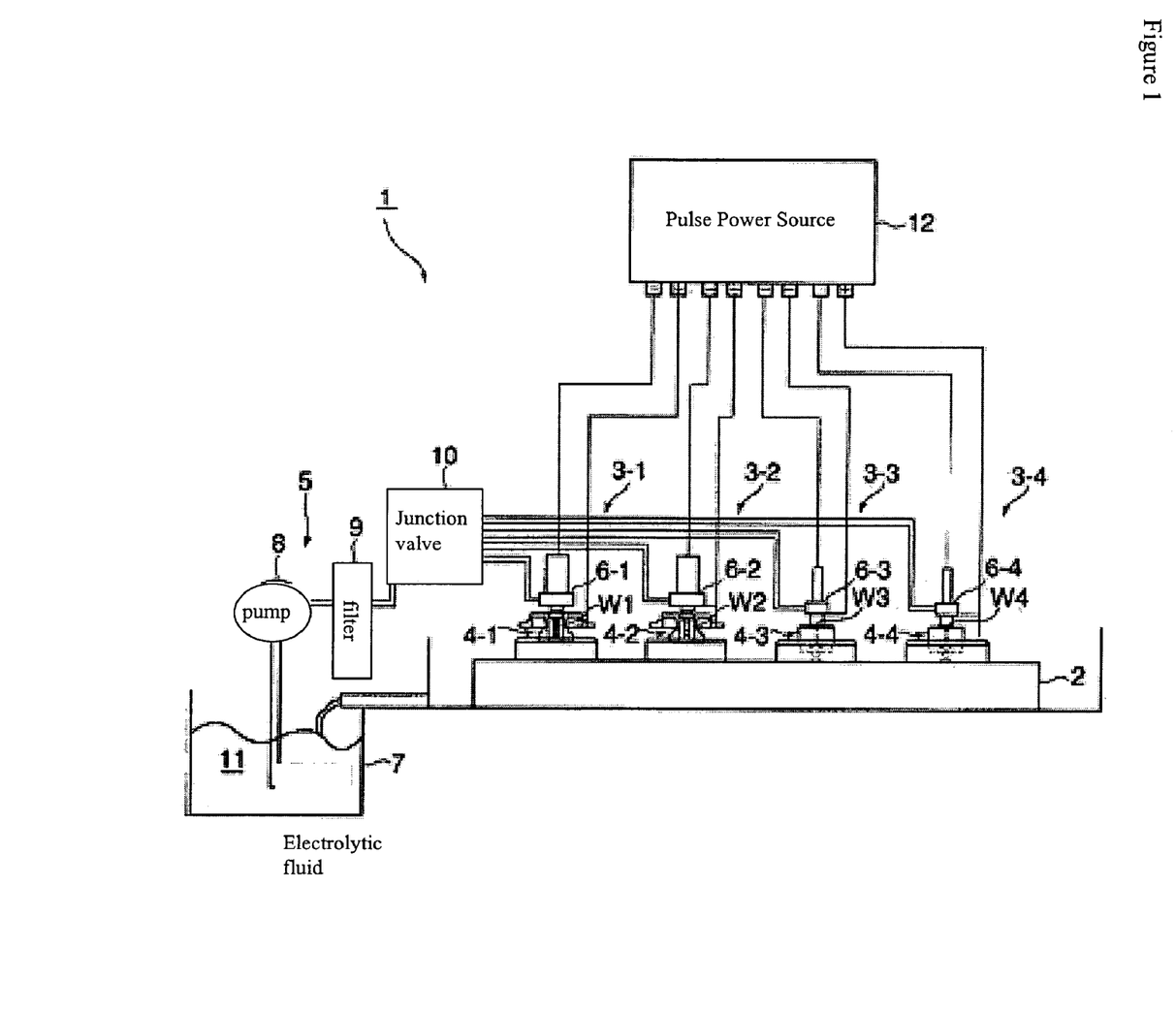
FIG. 1 is a schematic diagram depicting construction of a device for forming a fluid dynamic pressure bearing dynamic pressure-generating groove in accordance with the first embodiment of the present invention.
Figure 2:
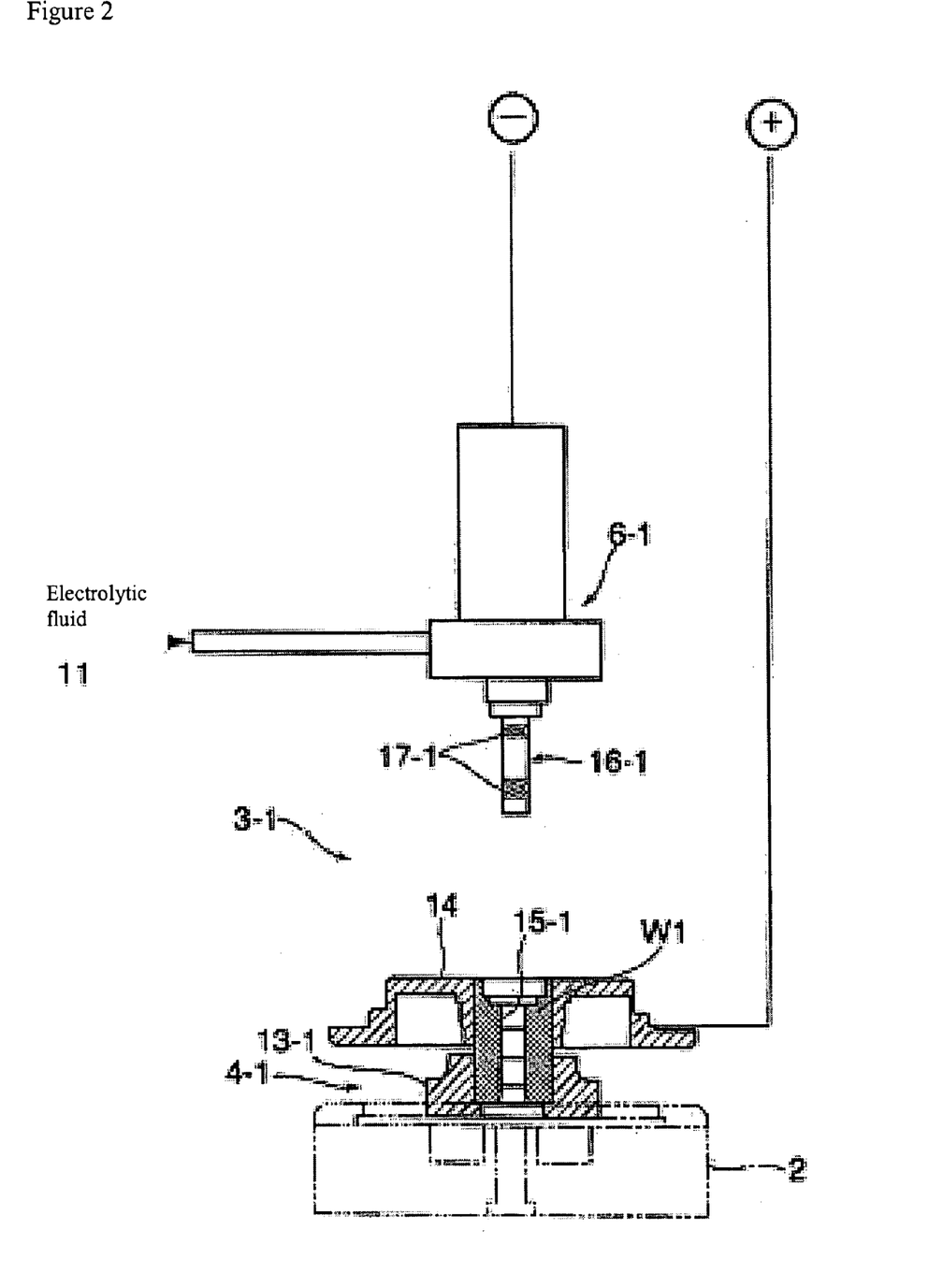
FIG. 2 is a schematic diagram explaining the machining method of a cylindrical rotary piece used in a fluid dynamic pressure bearing, wherein the surface to be machined is the inner circumferential surface of the rotary piece.
Figure 3:
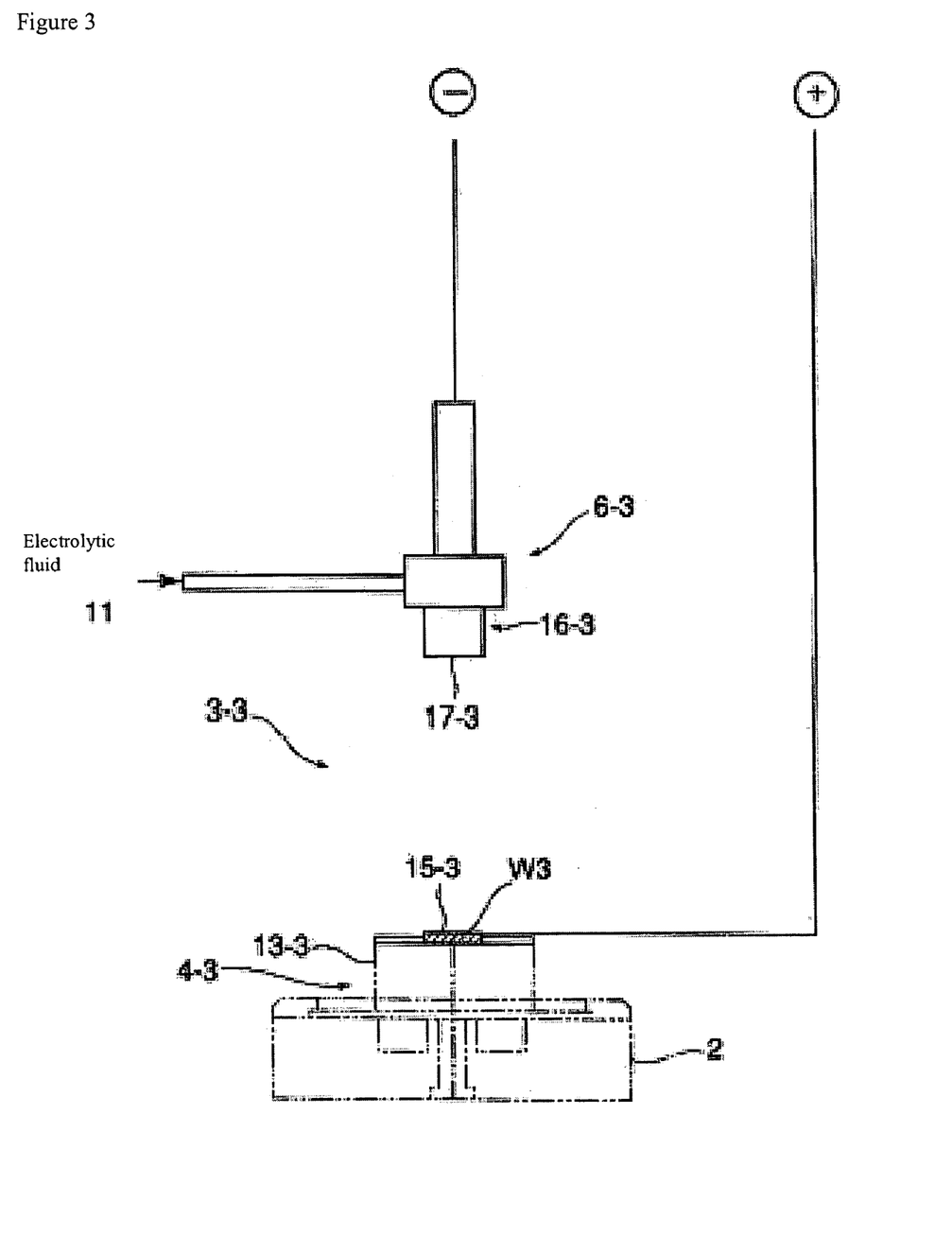
FIG. 3 is a schematic diagram explaining the machining method of a counter plate used in a fluid dynamic pressure bearing, wherein the surface to be machined is the end surface of the counter plate.

The present invention is explained with reference to one of its embodiments, shown in FIGS. 1 through 3. In accordance with the present embodiment, FIG. 1 depicts an overall construction of the device for forming dynamic pressure-generating grooves for a fluid dynamic pressure bearing. FIG. 2 illustrates a machining method used when the workpiece is a cylindrical rotary part which can later be used as a bearing sleeve in a fluid dynamic pressure bearing, wherein the inner circumferential surface of the workpiece is the target machining surface. Finally, FIG. 3 illustrates a machining method used when the workpiece is a counter plate of a fluid dynamic pressure bearing, and the target machining surface is one of the end surfaces of the counter plate.

As shown in FIG. 1, multiple machining devices 3-1, 3-2, 3-3, 3-4, . . . are aligned on machining bed 2 in the groove forming device of the present embodiment. Depending on particulars of a specific manufacturing process, these machining devices 3-1, 3-2, 3-3, 3-4 can be different machining devices or multiple units of the same machining device.

If necessary, all of these units may be simultaneously used for forming pressure-generating grooves. Alternatively, only some of the units may be selectively turned on. In the present embodiment, machining devices 3-1 and 3-2 are the same machining devices that perform the machining of an inner surface of the cylindrical rotary part. They are more particularly shown prior to implementation of machining in FIG. 2. In the present embodiment, machining devices 3-3 and 3-4 are the same machining devices that perform the machining of a surface of the counter plate. They are more particularly shown prior to implementation of machining in FIG. 3.

Broadly divided, machining devices 3-1, 3-2, 3-3, 3-4 respectively include support fixture portions 4-1, 4-2, 4-3, 4-4 which support and affix workpieces W1, W2, W3, W4; electrolyte supply portion 5 required for electrolytic machining; and electrode portions 6-1, 6-2, 6-3, 6-4 applying pulsed voltages.

Here, requisite fixtures are arrayed on the same machining bed 2 in accordance with the shape of workpieces W1, W2, W3, W4, for example, spindle motor rotary shaft, counter plate, etc., as the fixtures 13-1 (FIG. 2), 13-2, 13-3 (FIG. 3), 13-4 used in the fixture portions 4-1, 4-2, 4-3, 4-4.

In the electrolyte supply portion 5, a common electrolyte tank 7 is used with respect to all of the machining devices 3-1, 3-2, 3-3, 3-4 and electrolyte 11 is supplied to each machining device 3-1, 3-2, 3-3, 3-4 from electrolyte tank 7 by pump 8 through filter 9 and splitter (junction) valve 10. The speed of electrolyte fluid 11 flowing to each electrolytic machining portion of machining devices 3-1, 3-2, 3-3, 3-4 can be adjusted by setting pump 8 and splitter (junction) valve 10 to obtain the necessary electrolytic machining performance. Also, while not illustrated, junction valve 10 is constructed so as to be electrically controllable so that the required flow quantity of electrolyte 11 is supplied respectively to machining devices 3-1, 3-2, 3-3, 3-4. Electrolyte 11, which has passed through each electrolytic machining portion of machining devices 3-1, 3-2, 3-3, 3-4 and recovered the metal ions produced by electrolytic machining, is returned to electrolyte tank 7 through the recovery line.

Electrode portions 6-1, 6-2, 6-3, 6-4 correspond to the tool holding head in a machine tool. Negative terminals of the pulsed power supply 12 are connected to the tool holding heads, while positive poles are connected to workpieces W1, W2, W3, W4. Appropriate pulsed voltages are respectively applied between electrode portions 6-1, 6-2, 6-3, 6-4 and workpieces W1, W2, W3, W4. These pulsed voltages are applied in the predetermined pulsed voltage amounts and at the required time to the appropriate machining device for the electrolytic machining to be performed in machining devices 3-1, 3-2, 3-3, 3-4.

FIG. 2 shows an expansion of the pre-machining state of machining devices 3-1, 3-2 shown in FIG. 1. Although, the explanation below refers only to the machining device 3-1, it is equally applicable to the device 3-2.

Mounting part 13-1 of fixture portion 4-1 is located on the common machining bed 2 to accurately position, support and hold securely workpiece W1. As shown in FIG. 2, workpiece W1 is a rotary cylindrical member (sleeve) integrated as one part with rotor hub 14 of spindle motor. The inner cylindrical surface of the inner bore of the sleeve is the target machining surface 15-1, and tool 16-1 of electrode portion 6-1 is inserted into the bore so as to face this target machining surface 15-1. Tool 16-1 is supported by the base portion of electrode portion 6-1 projecting downwardly therefrom. Projecting electrode portions 17-1 are formed at 2 positions, top and bottom, of the outer circumferential surface of the tip portion on the rod-shaped electrode portion 6-1. Projecting electrode portions 17-1 include a projecting pattern of sideways Vs (or herringbone shaped protrusions). This sideways V-shaped pattern on projecting electrode portion 17-1 is transferred to target machining surface 15-1 of the cylindrical workpiece W1 by electrolytic machining.

A high degree of accuracy is sought for the dimension of the gap portion between projecting electrode portion 17-1 and target machining surface 15-1 of the workpiece W1. Therefore, the relative positional relationship between the workpiece W1 and tool 16-1 is set with high precision. Any groove pattern required for a particular fluid dynamic bearing may be set as the pattern of projecting electrode portion 17-1. For example, sideways V-shaped grooves, herringbone grooves, asymmetric grooves or any other appropriate groove pattern can be utilized.

Electrolyte 11 supplied from common electrolyte tank 7 is set so that it flows through the gap portion with a fixed flow rate. Metal ions produced by the electrical decomposition induced by the pulsed voltage applied between projecting electrode portion 17-1 and target machining surface 15-1 are quickly removed from target machining surface 15-1. Thus, the electrical decomposition is implemented continuously on target machining surface 15-1 during application of pulsed voltage, forming a dynamic pressure-generating groove of the desired shape on target machining surface 15-1.

FIG. 3 shows an expansion of the pre-machining state of machining devices 3-3, 3-4 shown in FIG. 1. Although, the explanation below refers only to the machining device 3-3, it is equally applicable to the device 3-4.

Mounting part 13-3 of fixture portion 4-3 is located on the common machining bed 2 to accurately position, support and hold securely workpiece W3. In this embodiment, workpiece W3 is a counter plate used in a fluid dynamic pressure bearing of a spindle motor. Target machining surface 15-3 is the end surface of the counter plate. This target machining surface 15-3 is accurately positioned with respect to projecting electrode portion 17-3 provided on the lower end surface of tool 16-3 of electrode portion 6-3. The pulsed voltage is applied between target machining surface 15-3 and projecting electrode portion 17-3 inducing electrolytic machining of the target surface. The role played by the electrolyte 11 is similar to the case of machining device 3-1 shown in FIG. 2.

Because of the construction described above, the present invention can achieve the following types of effects.

The same electrolyte 11 is directed from a common electrolyte tank 7 to each machining devices 3-1, 3-2, 3-3, 3-4 of the multiple workpieces W1, W2, W3, W4 and, therefore, even when forming dynamic pressure-generating grooves with differing shapes in multiple workpieces W1, W2, W3, W4 of the same or different types, a common electrolyte tank 7 may be used. Thus, manufacturing equipment requirements are reduced. It is also possible in the presently provided device to supply electrolyte 11 under the same conditions to multiple different workpieces W1, W2, W3, W4, to stabilize electrolytic machining accuracy and to improve quality. In particular, where multiple workpieces W1, W2, W3, W4 are multiple parts of the same finished product, the same machining accuracy is maintained throughout the whole finished part and performance is improved.

According to the provided groove forming method and device, electrolytic tank 7 is commonly used by all machining devices 3-1, 3-2, 3-3, 3-4. Therefore, there is no need to control each electrolyte tank separately, as was conventionally done, making operational control easier and permitting improved performance and reduced manufacturing cost.

Additionally, because each machining device 3-1, 3-2, 3-3, 3-4 of multiple workpieces W1, W2, W3, W4 is disposed on common machining bed 2, and machining is implemented by a pulsed voltage supplied from machining pulsed power supply 12, multiple workpieces W1, W2, W3, W4 can be simultaneously machined on the common machining bed 2 of a single machine (dynamic pressure-generating groove forming device 1). When multiple workpieces W1, W2, W3, W4 are multiple parts of the same finished product, it is easy to assemble the parts together simplifying and improving the manufacturing control. Controlling the settings for combinations of electrolyte and pulsed voltage to reflect concentration conditions and states of deterioration of electrolyte 11 is also simplified by the current invention. Also, the quality control over the shape of the dynamic pressure-generating grooves formed in target work surfaces 15-1, 15-2, 15-3, 15-4 of workpieces W1, W2, W3, W4 is simplified.

Pulsed voltages supplied from pulsed power supply 12 are controlled so as to be independently applied to multiple workpieces W1, W2, W3, W4. Therefore, differing machining conditions can be set for each workpiece, and many types of workpieces can be simultaneously manufactured on a common machining bed 2 of a single machine (dynamic pressure-generating groove forming device 1).

Depending on the structure of the spindle motor, there may be various shapes of workpieces which are targets for machining, but using the described groove forming device, it is possible to independently set pulsed voltage and application time for each differently-shaped workpiece W1, W2, W3, W4.

In the above described embodiments, the groove forming method and device therefore are described in their application to a spindle motor, but they are not limited thereto. Wide application to other parts or devices using similar fluid dynamic pressure bearings is possible, and the invention of the present application is not limited to the aforementioned embodiments. Various variations are possible within a range that does not depart from the essence of the invention of the present application.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. A method for forming a fluid dynamic pressure groove in a fluid dynamic pressure bearing, comprising the steps of:
  positioning and securing multiple workpieces to be machined to their respective machining devices;
  imparting an electrochemical dissolving effect to each target surface of said multiple workpieces to be machined, each of said workpieces serving as a part of said fluid dynamic pressure bearing; and
  forming at least one fluid dynamic pressure groove on said each target surface of said multiple workpieces to be machined, said groove having a specified shape, dimension and surface condition,
  wherein an electrolyte is directed from a common electrolyte tank to each of said machining devices used on said multiple workpieces.

2. The method for forming said fluid dynamic pressure groove according to claim 1, wherein all machining devices used on said multiple workpieces are located on a common machining bed, and wherein said step of imparting said electrochemical dissolving effect is accomplished by supplying a pulsed voltage from a pulsed power supply.

3. The method for forming said fluid dynamic pressure groove according to claim 2, wherein said pulsed voltage supplied from said pulsed power supply is independently applied and controlled with respect to each of said multiple workpieces.

* * * * *